United States Patent [19]

Chen

[11] Patent Number: 5,760,117
[45] Date of Patent: Jun. 2, 1998

[54] GELATINOUS COMPOSITION AND ARTICLES

[75] Inventor: John Y. Chen, Pacifica, Calif.

[73] Assignee: Applied Elastomerics, Inc., South San Francisco, Calif.

[21] Appl. No.: 581,191

[22] Filed: Dec. 29, 1995

Related U.S. Application Data

[63] Continuation-in-part of Ser. No. 288,690, Aug. 11, 1994, Pat. No. 5,633,286, Ser. No. 152,734, Nov. 15, 1993, Pat. No. 5,624,294, Ser. No. 705,096, May 23, 1991, Pat. No. 5,655,947, and Ser. No. 152,735, Nov. 15, 1993, Pat. No. 5,508,334, which is a continuation-in-part of Ser. No. 114,688, Aug. 30, 1993, Pat. No. 5,475,890, which is a continuation of Ser. No. 934,027, Aug. 24, 1992, Pat. No. 5,239,723, and a continuation-in-part of Ser. No. 935,540, Aug. 24, 1992, Pat. No. 5,336,708, which is a continuation-in-part of Ser. No. 876,118, Apr. 29, 1992, Pat. No. 5,324,222, said Ser. No. 705,096, is a continuation of Ser. No. 527,058, May 21, 1990, abandoned.

[51] Int. Cl.$^6$ .................. C08K 5/01; C08K 5/00; C08L 3/00

[52] U.S. Cl. .................. 524/270; 524/187; 524/226; 524/232; 524/271; 524/272; 524/275; 524/277; 524/284; 524/313; 524/375; 524/394; 524/399; 524/400; 524/474; 524/476; 524/490; 524/505

[58] Field of Search .................. 524/284, 474, 524/226, 476, 232, 490, 313, 505, 270, 271, 272, 277, 400, 187, 275, 394, 399, 315

[56] References Cited

U.S. PATENT DOCUMENTS

| | | | |
|---|---|---|---|
| 3,485,787 | 12/1969 | Haefele . | |
| 3,594,945 | 7/1971 | Turney . | |
| 3,676,387 | 7/1972 | Lindlof . | |
| 3,827,999 | 8/1974 | Crossland . | |
| 4,151,057 | 4/1979 | St. Clair . | |
| 4,176,240 | 11/1979 | Sabia . | |
| 4,259,540 | 3/1981 | Sabia . | |
| 4,351,913 | 9/1982 | Patel | 523/218 |
| 4,369,284 | 1/1983 | Chen . | |
| 4,389,461 | 6/1983 | Scott | 428/543 |
| 4,432,607 | 2/1984 | Levy . | |
| 4,492,428 | 1/1985 | Levy . | |
| 4,497,538 | 2/1985 | Patel . | |
| 4,509,821 | 4/1985 | Stenger . | |
| 4,600,261 | 7/1986 | Debbaut . | |
| 4,610,738 | 9/1986 | Jervis . | |
| 4,618,213 | 10/1986 | Chen | 524/476 |
| 4,643,924 | 2/1987 | Uken | 428/35 |
| 4,662,692 | 5/1987 | Uken . | |
| 4,680,233 | 7/1987 | Camin . | |
| 4,690,831 | 9/1987 | Uken . | |
| 4,709,982 | 12/1987 | Come . | |
| 4,716,183 | 12/1987 | Gamarra . | |
| 4,718,678 | 1/1988 | Vansant | 277/1 |
| 4,721,832 | 1/1988 | Toy | 174/87 |
| 4,737,128 | 4/1988 | Moormann et al. . | |
| 4,764,535 | 8/1988 | Leicht . | |
| 4,798,853 | 1/1989 | Handlin | 523/173 |
| 4,801,346 | 1/1989 | Huddleston . | |
| 4,822,834 | 4/1989 | Blevins . | |
| 4,833,193 | 5/1989 | Sieverding . | |
| 4,842,931 | 6/1989 | Zook | 428/354 |
| 4,864,725 | 9/1989 | Debbaut | 29/871 |
| 4,865,905 | 9/1989 | Uken . | |
| 4,875,870 | 10/1989 | Hardy | 439/204 |
| 4,883,431 | 11/1989 | Uken . | |
| 4,888,070 | 12/1989 | Clark . | |
| 4,889,403 | 12/1989 | Zucker . | |
| 4,889,717 | 12/1989 | Covington | 428/304 |
| 4,900,877 | 2/1990 | Holland . | |
| 4,909,756 | 3/1990 | Jervis . | |
| 4,942,270 | 7/1990 | Gamarra . | |
| 4,944,973 | 7/1990 | Follette . | |
| 4,983,008 | 1/1991 | Campbell | 350/96.16 |
| 4,997,612 | 3/1991 | Gianchandai | 524/275 |
| 5,059,748 | 10/1991 | Allen | 174/87 |
| 5,085,597 | 2/1992 | Story | 439/521 |
| 5,088,734 | 2/1992 | Glava | 273/73 |
| 5,149,736 | 9/1992 | Gamarra | 524/490 |
| 5,173,573 | 12/1992 | Jervis | 174/138 |
| 5,191,752 | 3/1993 | Murphy | 54/44.5 |
| 5,239,723 | 8/1993 | Chen | 524/476 |
| 5,336,708 | 8/1994 | Chen | 525/95 |
| 5,475,890 | 12/1995 | Chen | 524/476 |
| 5,508,334 | 4/1996 | Chen | 524/476 |
| 5,618,882 | 4/1997 | Hammond | 525/920 |

FOREIGN PATENT DOCUMENTS

| | | |
|---|---|---|
| 1268431 | 3/1972 | United Kingdom . |
| 268431 | 3/1972 | United Kingdom . |
| WO 88/00603 | 1/1988 | WIPO . |
| WO 91/05014 | 4/1991 | WIPO . |
| WO 93/05113 | 3/1993 | WIPO . |

OTHER PUBLICATIONS

SC:1102-89 Shell Chemical Technical Bulletin "KRATON® Thermoplastic Rubber in oil gels" Apr. 1989.

Septon trade literature. Kuraray Co., LTD. 1995.8 (4,000) 15 pages.

"Properties of Oriented Block coplolymers", A. Skoulios, Journal of Polymer Science: Polymer Symnposium 58, 369–379 (1977).

"Styrene–Diene Triblock Copolymers: Orientation Conditions and Mechanical Properties of The Oriented Materials" A. Weill and R. Pixa, Journal of Polymer Science Polymer Symposium 58, 381–394 (1977).

*Primary Examiner*—Herbert J. Lilling

[57] ABSTRACT

The gels of the the invention may be made non-adhearing, non-sticking, non-tacky by incorporating an advantage amount of fatty acids, metal stearates, and waxes.

7 Claims, No Drawings

GELATINOUS COMPOSITION AND ARTICLES

REFERENCE TO RELATED APPLICATIONS AND PATENTS

This application is a CIP of Ser. No. 08/288,690, filed Aug. 11, 1994, now U.S. Pat. No. 5,633,286, and a CIP of PCT/US94/07314 filed Jun. 27, 1994 and a CIP of PCT/US94/04278 filed Apr. 19, 1994, which is a CIP of 07/957,290, filed Oct. 6, 1992, now U.S. Pat. No. 5,334,646. This application is also a CIP of Ser. No. 08/152,734, filed Nov. 15, 1993, now U.S. Pat. No. 5,624,294, and a CIP of Ser. No. 08/152735, filed Nov. 15, 1993, now U.S. Pat. No. 5,508,334, which is a CIP of Ser. No. 08/114,688, filed Aug. 30, 1993, now U.S. Pat. No. 5,475,890, which is a continuation of 07/934,027, filed Aug. 24, 1992, now U.S. Pat. No. 5,239,723, and a CIP of 07/935,540, filed Aug. 24, 1992, now U.S. Pat. No. 5,336,708, which is a CIP of 07/876,118, filed Apr. 29, 1992, now U.S. Pat. No. 5,324,222. This application is also a CIP of Ser. No. 07/705,096, filed May 23, 1991, now U.S. Pat. No. 5,655,947, which is a continuation of 07/527,058, filed May 21, 1990, now abandoned.

FIELD OF THE INVENTION

The present invention relates to useful gelatinous compositions and articles.

BACKGROUND OF THE INVENTION

Thermoplastic elastomer oriented and non oriented non-adhearing gels are unknown.

SUMMARY OF THE INVENTION

The invention comprises a thermoplastic, heat formable and heat reversible, non-adhearing gelatinous elastomer composition (gel) and articles formed from (a) 100 parts by weight of one or more high viscosity linear, multi-arm, branched, or star shaped block copolymer; (b) from about 300 to about 1,600 parts by weight of a plasticizing oil; (c) a selected amount of one or more fatty acids or metal stearates or a mixture thereof in combination with; (d) a selected amount of one or more waxes or fatty amides or a mixture thereof, said amounts of (c) and (d) being sufficient to produce a substantially non-adhering gel; said block copolymer having the general configuration poly(styrene-ethylene-butylene-styrene), poly(styrene-ethylene-propylene-styrene), poly(styrene-ethylene-propylene)$_n$, poly(styrene-ethylene-butylene)$_n$ or a mixture thereof, wherein the subscript n is two or greater and optionally in combination with a selected amount of at least one polymer or copolymer selected from the group consisting of poly(styrene-butadiene-styrene), poly(styrene-butadiene)n, poly(styrene-butadiene), poly(styrene-isoprene-styrene), poly(styrene-isoprene)$_n$, poly(styrene-isoprene), poly(styrene-ethylene-propylene)$_n$, poly(styrene-ethylene-propylene), poly(styrene-ethylene-butylene)$_n$, poly(styrene-ethylene-butylene), polystyrene, polybutylene, poly(ethylene-propylene), poly(ethylene-butylene), polypropylene, or polyethylene, wherein said selected copolymer is a linear, branched, multi-arm, or star shaped copolymer; said fatty acids selected from stearic acid, lauric acid, myristic acid, palmitic acid and the like; said metal sterates selected from calcium stearate, magnesium sterate, zinc stearate, aluminum sterate and the like; said gel composition characterized by a gel rigidity of from about 20 to about 800 gram Bloom.

With respect to the subscript n, as for example in the case of multi-arm block copolymers, the word multi-arm means more than one arm (i.e. n=2, 3, 4, 5 and the like). Multi-arm block copolymers having n=2 denotes linear block copolymers. More specifically, when n=2, the block copolymers (SEP)n, (SEB)n, (SI)n, (SB)n are S-EP-EP-S or S-EP-S or simply SEPS, S-EB•EB-S or S-EB-S or simply SEBS, S-I•I-S or S-I-S or simply SIS, S-B•B-S or S-B-S or simply SBS respectively. When n=3, such as (SEP)$_{n-3}$, the block copolymer is denoted by The various aspects and advantages of the invention will become apparent to those skilled in the art upon consideration of the accompanying disclosure and the drawings.

DESCRIPTION OF THE PREFERRED EMBODIMENTS

The gels of the the invention may be made non-adhearing, non-sticking, non-tacky by incorporating an advantage amount of stearic acid (octadecanoic acid) and metal stearates (e.g., calcium stearate, magnesium sterate, zinc stearate, aluminum sterate, etc.) and waxes.

An advantage of making non-sticking, non-tacky gels is the use of waxes, steraric acid and waxes, metal sterate and waxes, metal sterate and steraric acid. The use of steraric acid alone do not reduce tack. The amount of steraric acid is also important. The ratio of 200 grams steraric acid to 2,000 gram of SEBS (a ratio of 0.1) will result in spotted tack reduction on the surface of the gel. A ratio of 250 to 2,000 will result in spotted crystallized regions on the surface of the gel or spotted tack reduction. A ratio of 300 to 2,000 will result in complete tack reduction with large crystallized regions on the surface of the gel. When microcrystalline waxes are incorporated together with steraric acid, the crystallization of steraric acid completely disappears from the surface of the gel. For example excellent result is achieved with 200 grams of steraric acid, 150 grams of microcrystalline wax and 2,000 grams of SEBS. The same excellent result is achieved when SEBS is adjusted to 3,000 grams, 4,000 grams, etc. The same result is achieved with SEPS.

The invention is to provide non-sticking oriented or non-oriented gels with improved high strength alignment properties as evidenced by optical techniques such as viewing non-sticking oriented or non-oriented gel in plane-polarized light non-sticking oriented or non-oriented gels exhibit birefringence in the relaxed unextended state non-sticking oriented or non-oriented gels with improved strength are suitable for use as dental floss since they do not break as easily as unoriented gels of the same rigidity.

Non-sticking oriented of non-oriented gels aligned by controlled stretching during the gel's transition from a heated, extremely non melting, non flowing state and the cooled solid gel state produces strong gels which are found to have greater tensile strength than gels of the same rigidity which have not been stretched to a selected degree during its heating and cooling histories. Gels which are selectively stretched during is (non melt flowing) heated state and rapidly cooled by flowing air, cold liquid bath or in contact with a cool surface exhibit optical birefringence when viewed under plane-polarized light. The degree of stretching during the gels cooling history from the heated state can vary. Stretching of at least about 50% to more than about 1000% are of advantage to produce birefrigence and stronger gels. Birefrigence is not observed in relaxed gels which do not undergo stretching during its heating and cooling histories. Slight to very strong birefringence are observed in relaxed gels which are stretched during its heating and cooling histories. It is evident that stressing the gel during its cooling history as it cools from the heated state produce unexpected stronger non-sticking oriented or non-oriented gels. We therefore consider non-sticking oriented or non-oriented gels to be a new and novel composition physically different from the less stronger gels formed without stressing during the gels cooling history and which do not show birefrigence in the relaxed state non-sticking oriented or non-oriented gels may be formed in combination with various substrates such as described below. In past situations where in order to obtain stronger gel strength, gels with higher rigidities and lower plasticizer content must be used, it is now possible to make a non-sticking oriented or non-oriented gel with the same plasticizer content having a higher useful gel strength.

Other materials (FIG. 1.) can be utilized to form composite non-sticking oriented or non-oriented gel articles include: GMG , MGM , MG1G2M, M1M2G1G2, M2M1G1G2, G1MG1G2, MG1G2, G1G2 M, G2 G1M, GM1M2 G, G1M1G2 M2 M1, M1GM2GM3GM4 , etc, where G=gel and M=material. The subscript 1, 2, 3, 4, etc., are different and is represented by n which is a positive number, when n is a subscript of M, n may be the same or different material and when n is a subscript of G, n can be the same or different rigidity, non-sticking oriented or non-oriented gel or the same or different gel material composition. The material (M) suitable for forming composite articles with the gelatinous elastomer compositions can include foam, plastic, fabric, metal, concrete, wood, wire screen, refractory material, glass, synthetic resin, synthetic fibers, and the like. Sandwiches of gel/material (i.e. gel-material-gel or material-gel-material, etc.) are ideal for use as shock absorbers, acoustical isolators, vibration dampers, vibration isolators, and wrappers. For example the vibration isolators can be use under research microscopes, office equipment, tables, and the like to remove background vibrations.

The non-sticking oriented or non-oriented gel compositions of the invention can be casted unto various substrates, such as open cell materials, metals, ceramics, glasses, and plastics, etc.; the molten gel composition is deformed as it is being cooled. Useful open-cell plastics include: polyamides, polyimides, polyesters, polyisocyanurates, polyisocyanates, polyurethanes, poly(vinyl alcohol), etc. Open-celled Plastic (sponges) suitable for use with the compositions of the invention are described in "Expanded Plastics and Related Products", Chemical Technology Review No. 221, Noyes Data Corp., 1983, and "Applied Polymer Science", Organic Coatings and Plastic Chemistry, 1975. These publications are incorporated herein by reference.

Triblock copolymer gels especially suitable for use in forming the non-sticking oriented or non-oriented gels of the invention include: SEBS gels; examples include: (a) Kraton G 1651, G 1654X gels; (b) Kraton G 4600 gels; (c) Kraton G 4609 gels; other less suitable SEBS oil gels: examples include: (d) Tuftec H 1051 gels; (e) Tuftec H 1041 gels; (f) Tuftec H 1052 gels, (g) Kruaray 4055 SEEPS (styrene-ethylene/ethylene-propylene-styrene) block polymer gels. Gels made from blends (polyblends) of (a)-(f) with other polymers and copolymers include: SEBS-SBS gels; SEBS-SIS gels; SEBS-(SEP) gels; SEBS-(SB)n gels; SEBS-(SEB)n gels; SEBS-(SEP)n gels; SEBS-(SI)n gels; SEBS-(SI) multiarm gels; SEBS-branched copolymers gels; SEBS-star shaped copolymer gels; gels made from blends of (a)–(f) with other homopolymers include: SEBS/polystrene gels; SEBS/polybutylene gels; SEBS/polyethylene gels; SEBS/polypropoylene gels. Other suitable thermoplastic elastomers in blends suitable for making gels include SEP/SEBS oil gels, SEP/SEPS oil gels, SEP/SEPS/SEB oil gels, SEPS/SEBS/SEP oil gels, SEB/SEBS, EB-EP/SEBS, SEBS/EB, SEBS/EP, SEPS/SEB, etc.

The following commercial elastomers can be formed with oil and in combination with other polymers into suitable gels for use in making the gels of the invention: Shell Kratons D1101, D1102, D1107, D1111, D1112, D1113X, D1114X, D1116, D1117, D1118X, D1122X, D1125X, D1133x, D1135X, D1184, D1188X, D1300X, D1320X, D4122, D4141, D4158, D4240, G1650, G1652, G1657, G1701X, G1702X, G1726X, G1750X, G1765X, FG1901X, FG1921X, D2103, D2109, D2122X, D3202, D3204, D3226, D5298, D5999X, D7340, G1654X, G2701, G2703, G2705, G1706, G2721X, G7155, G7430, G7450, G7523x, G7528X, G7680, G7705, G7702X, G7720, G7722X, G7820, G7821X, G7827, G7890X, G7940; Kuraray's SEP/SEPS or SEP/SEB/SEPS Nos. 1001, 2002, 2003, 3023, 2043, 2063, 2005, 2006, 2050, 2103, 2104, 2105, and 4055 SEEPS made from hydrogenated styrene isoprene/butadiene block copolymer or more specifically made from hydrogenated styrene block polymer with 2-methyl-1,3-butadiene and 1,3-butadiene.

The most preferred non-sticking oriented or non-oriented gels forming the invention comprise a high viscosity triblock copolymers which have the more general, configuration A-B-A wherein each A is a crystalline polymer end block segment of polystyrene; and B is a elastomeric polymer center block segment of poly(ethylene-butylene) or poly (ethylene-propylene). The poly(ethylene-butylene) or poly (ethylene-propylene) and polystyrene portions are incompatible and form a two-phase system consisting of submicron domains of glassy A interconnected by flexible B chains. These domains serve to crosslink and reinforce the structure. This physical elastomeric network structure is reversible, and heating the polymer above the softening point of polystyrene temporarily disrupt the structure, which can be restored by lowering the temperature. Most recent reviews of triblock copolymers are found in the "ENCYCLOPEDIA OF POLYMER SCIENCE AND ENGINEERING", Volume 2 and 5, 1987–1988; "Thermoplastic Elastomers", MODERN PLASTIC ENCYCLOPEDIA, 1989; and Walker. B. M., Ed., et al., HANDBOOK OF THERMOPLASTIC ELASTOMERS, Van Nostrand Reinhold Co., 2nd Edition, 1988. There publications are incorporated herein by reference).

The especially suitable gels can be prepared by melt blending an admixture comprising: (A) 100 parts by weight of a high viscosity triblock copolymer of the general configurations poly(styrene-ethylene-butylene-styrene) or poly (styrene-ethylene-propylene-styrene) (herein referred to as "SEBS" or "SEPS") where said triblock copolymer is characterized as having a Brookfield Viscosity of a 20 weight percent solids solution of said triblock copolymer in toluene at 25° C. of about 1,800 cps and higher. (B) from about 200 to about 1,300 parts by weight of an plasticizing oil.

Less typically, the Brookfield Viscosity values of (A) can range from about 1,800 cps to about 30,000 cps or higher. The proportion of hydrocarbon plasticizing oil in (B) is more preferably from about 250 to about 1,200 parts per 100 parts of the triblock copolymer.

The high viscosity triblock copolymer of the invention can have a broad range of styrene end block to ethylene and butylene center block ratio of approximately about 20:80 or less to about 40:60 or higher. Examples of high viscosity triblock copolymers that can be utilized to achieve one or more of the novel properties of the present invention are styrene-ethylene-butylene-styrene block copolymers (SEBS) available from Shell Chemical Company and Pecten Chemical Company (divisions of Shell Oil Company) under trade designations Kraton G 1651, Kraton G 1654X, Kraton G 4600, Kraton G 4609 and the like. Other grades of (SEBS) polymers can also be utilized in the present invention provided such SEBS polymers exhibits the required high viscosity. Such SEBS polymers include (high viscosity) Kraton G 1855X which has a Specific Gravity of 0.92, Brookfield Viscosity of a 25 weight percent solids solution in toluene at 25° C. of about 40,000 cps or about 8,000 to about 20,000 cps at a 20 weight percent solids solution in toluene at 25° C.

The styrene to ethylene and butylene weight ratios for these Shell designated polymers can have a low range of 20:80 or less. Although the typical ratio values for Kraton G 1651, 4600, and 4609 are approximately about 33:67 and for Kraton G 1855X approximately about 27:73, Kraton G 1654X (a lower molecular weight version of Kraton G 1651 with somewhat lower physical properties such as lower solution and melt viscosity) is approximately about 31:69, these ratios can vary broadly from the typical product specification values.

The styrene to ethylene and butylene weight ratio of SEBS useful in forming the bodies 2 can range from lower than about 20:80 to above about 40:60. More specifically, the values can be 19:81, 20:80, 21:79, 22:78, 23:77, 24:76, 25:75, 26:74, 27:73, 28:72, 29:71, 30:70, 31:69, 32:68, 33:67, 34:66, 35:65, 36:64, 37:63, 38:62, 39:61, 40:60, 41:59, 42:58, 43:57, 44:65, 45:55, 46:54, .47:53, 48:52, 49:51, 50:50, 51:49, and etc. Other ratio values of less than 19:81 or higher than 51:49 are also possible. Shell Technical Bulletin SC:1393-92 gives solution viscosity as measured with a Brookfield model RVT viscometer at 25° C. for Kraton G 1654X at 10% weight in toluene of approximately 400 cps and at 15% weight in toluene of approximately 5,600 cps. Broadly, the styrene end block to ethylene and butylene center block ratio of the triblock copolymers of the invention is about 20:80 to about 40:60, less broadly about 31:69 to about 40:60, preferably about 32:68 to about 38:62, more preferably about 32:68 to about 36:64, particularly more preferably about 32:68 to about 34:66, especially more preferably about 33:67 to about 36:64, and most preferably about 33:67. In accordance with the present invention, triblock copolymers such as Kraton G 1654X having ratios of 31:69 or higher can be used and do exhibit some very similar physical properties in many respects to Kraton G 1651 while Kraton G 1654X with ratios below 31:69 may also be use, but they are less preferred due to their decrease in the desirable properties of the final gel. Various triblock copolymers of the gels forming the compositions of the invention can be blended so as to produce a blend of varying ratios of triblock copolymers as desired.

Examples of moderate high viscosity SEEPS triblock copolymers includes Kuraray's 4055 which exhibits a solution viscosity at 10 weight %, 30° C. of 59 and a styrene content by weight of about 30%.

Examples of representative commercially oils include Amoco® polybutenes, hydrogenated polybutenes and polybutenes with epoxide functionality at one end of the polybutene polymer: Example of such polybutenes include: L-14 (320 Mn), L-50 (420 Mn), L-100 (460 Mn), H-15 (560 Mn), H-25 (610 Mn), H-35 (660 Mn), H-50 (750 Mn), H-100 (920 Mn), H-300 (1290 Mn), L-14E (27–37 cst @ 100° F. Viscosity), H-300E (635–690 cst @ 210° F. Viscosity), Actipol E6 (365 Mn), E16 (973 Mn), E23 (1433 Mn) and the like. Example of various commercially oils include: ARCO Prime (55, 70, 90, 200, 350, 400 and the like), Duraprime and Tufflo oils (6006, 6016, 6016M, 6026, 6036, 6056, 6206, etc) , other white mineral oils include: Bayol, Bernol, American, Blandol, Drakeol, Ervol, Gloria, Kaydol, Litetek, Lyondell (Duraprime 55, 70, 90, 200, 350, 400, etc), Marcol, Parol, Peneteck, Primol, Protol, Sontex, and the like.

Generally, plasticizing oils with average molecular weights less than about 200 and greater than about 700 may also be used (e.g. H-300 (1290 Mn)).

Other polymers and copolymers (in major or minor amounts) can be melt blended with the SEBS as mentioned above without substantially decreasing the desired properties. Such polymers include (SBS) styrene-butadiene-styrene block copolymers, (SIS) styrene-isoprene-styrene block copolymers, (low styrene content SEBS) styrene-ethylene-butylene-styrene block copolymers, (SEP) styrene-ethylene-propylene block copolymers, (SEPS) styrene-ethylene-propylene-styrene block copolymers, (SB)n styrene-butadiene block copolymers and (SEB)n poly(styrene-ethylene-butylene)n, (SEP)n poly(styrene-ethylene-propylene)n, (SI)n poly(styrene-isoprene)n, multi-arm, branched, and star shaped copolymers and the like. Still, other homopolymers can be utilized in minor amounts; these include: polystyrene, polybutylene, polyethylene, polypropoylene and the like.

Gels having gel rigidities of from less than about 20 gram Bloom to about 800 gram Bloom and higher are especially advantageous and suitable for forming the non-sticking oriented or non-oriented gels of the invention, typically 200 gram Bloom to about 700 gram Bloom.

As used herein, the term "gel rigidity" in gram Bloom is determined by the gram weight required to depress a gel a distance of 4 mm with a piston having a cross-sectional area of 1 square centimeter at 23° C.

Gels less suitable and less advantageous for use in the present invention include oil gels as described in PCT Publications W088/00603; W09/305113; and W091/05014.

Plasticizers particularly preferred for use in practicing the present invention are will known in the art, they include rubber processing oils such as paraffinic and naphthenic petroleum oils, highly refined aromatic-free paraffinic and naphthenic food and technical grade white petroleum mineral oils, and synthetic, liquid oligomers of polybutene, polypropene, polyterpene, etc. The synthetic series process oils are high viscosity oligomers which are permanently fluid liquid nonolefins, isoparaffins or paraffins of moderate to high molecular weight.

The oriented gels can also contain useful amounts of conventionally employed additives such as stabilizers, antioxidants, antiblocking agents, colorants, fragrances, flame retardants, other polymers in minor amounts and the like to an extend not affecting or substantially decreasing the desired properties of the present invention.

Additives useful in the gel of the present invention include: tetrakis[methylene 3,-(3',5'-di-tertbutyl-4"-hydroxyphenyl) propionate] methane, octadecyl 3-(3',5'-di-tert-butyl-4"-hydroxyphenyl) propionate, distearyl-pentaerythritol-diproprionate, thiodiethylene bis-(3,5-ter-butyl-4-hydroxy) hydrocinnamate, (1,3,5-trimethyl-2,4,6-tris[3,5-di-tert-butyl-4-hydroxybenzyl] benzene), 4,4"-methylenebis(2,6-di-tert-butylphenol). The gel can also contain metallic pigments (aluminum and brass flakes), $TiO_2$, mica, fluorescent dyes and pigments, phosphorescent pigments, aluminatrihydrate, antimony oxide, iron oxides ($Fe3O4$, $-Fe2O3$, etc.), iron cobalt oxides, chromium dioxide, iron, barium ferrite, strontium ferrite and other magnetic particle materials, molybdenum, silicone fluids, lake pigments, aluminates, ceramic pigments, ironblues, ultramarines, phthalocynines, azo pigments, carbon blacks, silicon dioxide, silica, clay, feldspar, glass microspheres, barium ferrite, wollastonite and the like.

Additives which are highly advantages for forming non-sticking gels are fatty acids, fatty amides, metal stearates, and waxes. Such fatty acids include: stearic acid, lauric acid, myristic acid, palmitic acid made by Humko Chemical. Commercially available sterates include calcium stearate, magnesium stearate, zinc stearate, and aluminum stearate, and the like. Fatty amides from Witco include: oleic acid, stearamide, behenamide, oleamide, erucamide, N,N"-ethylenebisstearamide, N,N"-ethylenebisoleamide, sterryl erucamide, erucyl erucamide, oleyl palmitamide, stearyl stearamide, erucyl stearamide, and the like. Suitable waxes include: polyethylene, polypropylene, microcrystalline, carnauba, paraffin, montan, candelilla, beeswax, ozokerite, ceresine, and the like.

The non-sticking oriented or non-oriented compositions of the present invention are prepared by blending together the components including other additives as desired at about 23° C. to about 100° C. forming a paste like mixture and further heating said mixture uniformly to about 150° C. to about 200° C. until a homogeneous molten blend is obtained. Lower and higher temperatures can also be utilized depending on the viscosity of the oils and amount of SEBS used. These components blend easily in the melt and a heated vessel equipped with a stirrer is all that is required. As an example, small batches can be easily blended in a test tube using a glass stirring rod for mixing. While conventional large vessels with pressure and/or vacuum means can be utilized in forming large batches of the instant compositions in amounts of about 40 lbs or less to 10,000 lbs or more. For example, in a large vessel, inert gases can be employed for removing the composition from a closed vessel at the end of mixing and a partial vacuum can be applied to remove any entrapped bubbles. Stirring rates utilized for large batches can range from about less than about 10 rpm to about 40 rpm or higher.

While preferred components and formulation ranges have been disclosed herein, persons of skill in the art can extend these ranges using appropriate material according to the principles discussed herein. All such variations and deviations which rely on the teachings through which the present invention has advanced the art are considered to be within the spirit and scope of the present invention.

The non-sticking oriented or non-oriented gelatinous elastomer composition of the invention is excellent for forming the gelatinous elastomer articles of the invention. The gelatinous elastomer articles can be formed by casting, dipping, moulding, blending, injection molding, extruding and other conventional methods. For example, Shapes having various crossection can be extruded; and as the hot extradate is emerging from the extrusion die, the extradate can be stretched, pulled, twisted or in various manner stressed as it is rapidly placed in contact with cooling air or cool water bath.

The composition can also be remelted in any suitable hot melt applicator and extruded or spun into threads, bands, or other shapes. The basis of this invention resides in the fact that a high viscosity poly(styrene- ethylene-butylene-styrene) triblock copolymer having styrene end block to ethylene and butylene center block ratio preferably within the contemplated range of from about 20:80 to about 40:60, more preferably from between about 31:69 to about 40:60 when blended in the melt with an appropriate amount of plasticizing oil makes possible the attainment of gelatinous elastomer compositions having a desirable combination of physical and mechanical properties, notably high elongation at break of at least 1,600%, ultimate tensile strength of about at least $8 \times 10^5$ dyne/cm$^2$, low elongation set at break of substantially not greater than about 2%, tear resistance of at least $5 \times 10^5$ dyne/cm$^2$, substantially about 100% snap back when extended to 1,200% elongation, and a gel rigidity of substantially not greater than about 700 gram Bloom. It should be noted that when the ratio falls below 31:69, various properties such as elongation, tensile strength, tear resistance and the like can decrease while retaining other desired properties, such as gel rigidity, flexibility, elastic memory.

More specifically, the gelatinous composition of the present invention exhibit one or more of the following properties. These are: (1) tensile strength of about $8 \times 10^5$ dyne/cm$^2$ to about $10^7$ dyne/cm$^2$; (2) elongation of about 1,600% to about 3,000% and higher; (3) elasticity modulus of about $10^4$ dyne/cm$^2$ to about $10^6$ dyne/cm$^2$; (4) shear modulus of about $10^4$ dyne/cm$^2$ to about $10^6$ dyne/cm$^2$ as measured with a 1, 2, and 3 kilogram load at 23° C.; (5) gel rigidity of about 20 gram Bloom or lower to about 800 gram Bloom as measured by the gram weight required to depress a gel a distance of 4 mm with a piston having a cross-sectional area of 1 square cm at 23° C.; (6) tear propagation resistance of at least about $5 \times 10^5$ dyne/cm$^2$; (7) and substantially 100% snap back recovery when extended at a crosshead separation speed of 25 cm/minute to 1,200% at 23° C. Properties (1), (2), (3), and (6) above are measured at a crosshead separation speed of 25 cm/minute at 23° C.

The non-sticking oriented or non-oriented gelatinous elastomer articles of the instant compositions have various additional important advantages in that they do not crack, creep, tear, crack, or rupture in flextural, tension, compression, or other deforming conditions of normal use; but rather the moulded articles made from the instant composition possess the intrinsic properties of elastic memory enabling the articles to recover and retain its original moulded shape after many extreme deformation cycles as compared to prior art triblock copolymer oil-extended compositions. In applications where low rigidity, high elongation, good compression set and excellent tensile strength are important, the instant compositions would be preferred.

The gelatinous elastomer compositions of the present invention are useful in low frequency vibration applications, such as viscoelastic layers in constrained-layer damping of mechanical structures and goods, as viscoelastic layers used in laminates for isolation of acoustical and mechanical noise, as antivibration elastic support for transporting shock sensitive loads, as vibration isolators for an optical table, as viscoelastic layers used in wrappings, enclosures and linings to control sound, as compositions for use in shock and dielectric encapsulation of optical, electrical, and electronic components. The compositions are also useful as dental floss, exercise elastic stretch bands.

Generally the molten gelatinous elastomer composition will adhere sufficiently to certain plastics (e.g. acrylic, ethylene copolymers, nylon, polybutylene, polycarbonate, polystyrene, polyester, polyethylene, polypropylene, styrene copolymers, and the like) provided the temperature of the molten gelatinous elastomer composition is sufficient high to fuse or nearly fuse with the plastic. In order to obtain sufficient adhesion to glass, ceramics, or certain metals, sufficient temperature is also required (e.g. above 250OF).

Commercial resins which can aid in adhesion to materials (plastics, glass, and metals) may be added in minor amounts to the gelatinous elastomer composition, these resins include: Super Statac, Nevtac, Piccotac, Escorez, Wingtack, Hercotac, Betaprene, Zonarez, Nirez, Piccolyte, Sylvatac, Foral, Pentalyn, Arkon P, Regalrez, Cumar LX, Picco 6000, Nevchem, Piccotex, Kristalex, Piccolastic, LX-1035, and the like.

The invention is further illustrated by means of the following illustrative embodiments, which are given for purpose of illustration only and are not meant to limit the invention to the particular components and amounts disclosed.

EXAMPLE I

One hundred parts by weight of a high viscosity poly (styrene-ethylene-butylene-styrene) triblock copolymer (Shell Kraton G 1651) having a styrene end block to ethylene and butylene center block ratio of about 33:67 with 0.1 parts by weight of a stabilizer (Irrganox 1010) was melt blended with various quantities of a naphthenic oil (ARCO Tufflo 6024). Samples having the dimensions of 5 cm×5 cm×3 cm were cut and measured for gel rigidity on a modified Bloom gelometer as determined by the gram weight required to depress the gel a distance of 4 mm with a piston having a cross-sectional area of 1 cm$^2$. The average gel rigidity values with respect to various oil concentrations are set forth in Table I below.

TABLE I

| Oil per 100 parts of Triblock copolymer | Gel Rigidity, gram Bloom |
|---|---|
| 360 | 500 |
| 463 | 348 |
| 520 | 280 |
| 615 | 240 |
| 635 | 220 |
| 710 | 172 |
| 838 | 135 |
| 1,587 | 54 |

EXAMPLE II

Example I was repeated except about 980 parts oil was used and the gel rigidity found to about 101 gram Bloom. Other properties measured were: tensile strength at break about 4.4×10$^6$ dyne/cm2, elongation at break about 2.4470%, elasticity modulus about 3.5×10$^4$ dyne/cm2, and shear modulus about 3.7×10$^4$ dyne/cm2. The tensile strength, elongation, elasticity modulus were measured with cross-head separation speed of 25 cm/minute at room temperature. The shear modulus was measured with a 1, 2, and 3 kilogram load at room temperature.

EXAMPLE III

Example I was repeated except about 520 parts of a polybutene (Amoco Indopol H-300) was used and the gel rigidity found to be about substantially unchanged with respect to use of naphthenic oil alone.

EXAMPLE IV

Example I was repeated except about 520 parts of a polypropene (Amoco C-60) was used and the gel rigidity found to be about substantially unchanged with respect to use of naphthenic oil alone.

EXAMPLE V

Example I was repeated except about 520 parts of a polyterpene (Hercules Piccolyte S10) was used and the gel rigidity found to be about substantially unchanged with respect to use of naphthenic oil alone.

EXAMPLE VI

Example I was repeated except about 360 parts of a combined mixture of: 72 parts of a paraffinic oil (ARCO prime 200), 72 pars of a naphthenic oil (ARCO Tufflo 6014), 72 parts of a polybutene oligomer (Amoco Indopol H-200), 72 parts of a polypropene oligomer (Amoco Polypropene C-60), and 72 parts of a polyterpene oligomer (Hercules Piccolyte S10) was used and the gel rigidity found to be about substantially unchanged with respect to the use of naphthenic oil alone.

EXAMPLE VII

Example II was repeated except 933 parts oil with 147 parts by weight of a high viscosity poly(styrene-ethylene-butylene-styrene) triblock copolymer containing 47 parts of a naphthenic process oil (Shell Kraton G 4609) having a styrene to ethylene and butylene ratio of about 33:67 was used and the physical properties were found to be about substantially unchanged with respect to the components used in Example II.

EXAMPLE VIII

Example I was repeated except about 400 parts of oil was used and the properties measured were: tear propagation about 1.4×10$^6$ dyne/cm$^2$, no crack growth in 180° bend under 50 gram load for 5,000 hours at room temperature, tensile strength about 4×10$^6$ dyne/cm2, elongation at break about 1,700%, tensile set about 0% at 1,200% elongation, compression set about 0% when tested under 5,000 gram load for 24 hours, and 100% snap back recovery after extension to 1,200%.

EXAMPLE IX

Example I was repeated except a high viscosity poly (styrene-ethylene-propylene-styrene) is used and the gel rigidity found to be about substantially unchanged.

EXAMPLE X

Examples I–IX are repeated and the gels are extruded and rapidly stretched up to 800% elongation by hand in a cooled water bath. The resulting gels show birefrigence and greater strength than corresponding unstretched gels.

While certain features of this invention have been described in detail with respect to various embodiments thereof, it will, of course, be apparent that other modifications can be made within the spirit and scope of this invention, and it is not intended to limit the invention to the exact details shown above except insofar as they are defined in the following claims.

What I claim is:

1. A composition comprising: a non-adhearing gel formed from (a) 100 parts by weight of one or more high viscosity block copolymer; (b) from about 300 to about 1,600 parts by weight of a plasticizing oil; (c) a selected amount of one or more fatty acids or metal stearates or a mixture thereof in combination with; (d) a selected amount of one or more waxes or fatty amides or a mixture thereof said amounts of (c) and (d) being sufficient to produce a substantially non-adhering gel: said composition characterized by a gel rigidity of from about 20 to about 800 gram Bloom.

2. A non-adhearing gel of claim 1, wherein said block copolymer is a linear, multi-arm, branched, or star shaped block copolymer of the general configuration poly(styrene-ethylene-butylene-styrene), poly(styrene-ethylene-propylene-styrene) or a mixture thereof and optionally in combination with a selected amount of at least one polymer or copolymer selected from the group consisting of poly(styrene-butadiene-styrene), poly(styrene-butadiene), poly(styrene-isoprene-styrene), poly(styrene-isoprene), poly(styrene-ethylene-propylene)$_n$, poly(styrene-ethylene-propylene-styrene), poly(styrene-ethylene-butylene-styrene), poly(styrene-ethylene-butylene)$_n$, polystyrene, polybutylene, poly(ethylene-propylene), poly(ethylene-butylene), polypropylene, or polyethylene, wherein said selected copolymer is a linear, branched, multi-arm, or star shaped copolymer and the subscript n is two or greater.

3. A non-adhearing gel of claim 1, wherein said block copolymer is a linear, multi-arm, branched, or star shaped block copolymer of the general configuration poly(styrene-ethylene-butylene-styrene), poly(styrene-ethylene-propylene-styrene), poly(styrene-ethylene-propylene)$_n$, poly(styrene-ethylene-butylene)$_n$, wherein the subscript n is two or greater or a mixture thereof and optionally in combination with a selected amount of at least one polymer or copolymer selected from the group consisting of poly(styrene-butadiene-styrene), poly(styrene-butadiene)n, poly(styrene-butadiene), poly(styrene-isoprene-styrene), poly(styrene-isoprene)$_n$, poly(styrene-isoprene), poly(styrene-ethylene-propylene)$_n$, poly(styrene-ethylene-propylene), poly(styrene-ethylene-butylene)$_n$, poly(styrene-ethylene-butylene), polystyrene, polybutylene, poly(ethylene-propylene), poly(ethylene-butylene), polypropylene, or polyethylene, wherein said selected copolymer is a linear, branched, multi-arm, or star shaped copolymer; said composition characterized by a gel rigidity of from about 20 to about 800 gram Bloom.

4. A non-adhearing gel of claim 1, wherein said block copolymer is a linear, multi-arm, branched, or star shaped block copolymer of the general configuration poly(styrene-ethylene-propylene)$_n$, poly(styrene-ethylene-butylene)$_n$ or a mixture thereof, wherein the subscript n is two or greater and optionally in combination with a selected amount of at least one polymer or copolymer selected from the group consisting of poly(styrene-butadiene-styrene), poly(styrene-butadiene)n, poly(styrene-butadiene), poly(styrene-isoprene-styrene), poly(styrene-isoprene)$_n$, poly(styrene-isoprene), poly(styrene-ethylene-propylene)$_n$, poly(styrene-ethylene-propylene), poly(styrene-ethylene-butylene)$_n$, poly(styrene-ethylene-butylene), polystyrene, polybutylene, poly(ethylene-propylene), poly(ethylene-butylene), polypropylene, or polyethylene, wherein said selected copolymer is a linear, branched, multi-arm, or star shaped copolymer; said composition characterized by a gel rigidity of from about 20 to about 800 gram Bloom.

5. A non-adhearing gel of claim 1, wherein said block copolymer is a multi-arm block copolymer of the general configuration poly(styrene-ethylene-propylene)$_n$, poly(styrene-ethylene-butylene)n or a mixture thereof, wherein the subscript n is two or greater and optionally in combination with a selected amount of at least one polymer or copolymer selected from the group consisting of poly(styrene-butadiene-styrene), poly(styrene-butadiene)n, poly(styrene-butadiene), poly(styrene-isoprene-styrene), poly(styrene-isoprene)$_n$, poly(styrene-isoprene), poly(styrene-ethylene-propylene)$_n$, poly(styrene-ethylene-propylene), poly(styrene-ethylene-butylene)$_n$, poly(styrene-ethylene-butylene), polystyrene, polybutylene, poly(ethylene-propylene), poly(ethylene-butylene), polypropylene, or polyethylene, wherein said selected copolymer is a linear, branched, multi-arm, or star shaped copolymer; said composition characterized by a gel rigidity of from about 20 to about 800 gram Bloom.

6. A non-adhearing gel of claim 1, wherein said block copolymer is a multi-arm block copolymer of the general configuration poly(styrene-ethylene-propylene)$_n$, wherein the subscript n is two or greater and optionally in combination with a selected amount of at least one polymer or copolymer selected from the group consisting of poly(styrene-butadiene-styrene), poly(styrene-butadiene)n, poly(styrene-butadiene), poly(styrene-isoprene-styrene), poly(styrene-isoprene)$_n$, poly(styrene-isoprene), poly(styrene-ethylene-propylene)$_n$, poly(styrene-ethylene-propylene), poly(styrene-ethylene-butylene)$_n$, poly(styrene-ethylene-butylene), polystyrene, polybutylene, poly(ethylene-propylene), poly(ethylene-butylene), polypropylene, or polyethylene, wherein said selected copolymer is a linear, branched, multi-arm, or star shaped copolymer; said composition characterized by a gel rigidity of from about 20 to about 800 gram Bloom.

7. A non-adhearing gel of claim 1, wherein said block copolymer is a multi-arm block copolymer of the general configuration poly(styrene-ethylene-butylene)$_n$, wherein the subscript n is two or greater and optionally in combination with a selected amount of at least one polymer or copolymer selected from the group consisting of poly(styrene-butadiene-styrene), poly(styrene-butadiene)n, poly(styrene-butadiene), poly(styrene-isoprene-styrene), poly(styrene-isoprene)$_n$ poly(styrene-isoprene), poly(styrene-ethylene-propylene)$_n$ poly(styrene-ethylene-propylene), poly(styrene-ethylene-butylene)$_n$, poly(styrene-ethylene-butylene), polystyrene, polybutylene, poly(ethylene-propylene), poly(ethylene-butylene), polypropylene, or polyethylene, wherein said selected copolymer is a linear, branched, multi-arm, or star shaped copolymer; said composition characterized by a gel rigidity of from about 20 to about 800 gram Bloom.

* * * * *